Patented Mar. 25, 1930

1,751,670

UNITED STATES PATENT OFFICE

JULIUS von BRAUN AND OTTO BAYER, OF FRANKFORT-ON-THE-MAIN, GERMANY, ASSIGNORS TO GENERAL ANILINE WORKS, INC., OF NEW YORK, N. Y., A CORPORATION OF DELAWARE

PROCESS OF CATALYTICALLY REDUCING ANTHRAQUINONE COMPOUNDS AND NEW HYDROGENIZED PRODUCTS DERIVED THEREFROM

No Drawing. Application filed February 27, 1926, Serial No. 91,227, and in Germany March 3, 1925.

Our invention relates to a new process of catalytically reducing anthraquinone compounds and new hydrogenized products derived therefrom. The process consists in treating the anthraquinone compounds in a non-acidic medium with hydrogen at elevated temperatures and preferably under pressure in the presence of the usual base metal reduction catalysts advantageously with the addition of an organic solvent or diluent.

It is a very remarkable fact that our process runs in phases, so that according to the quantity of hydrogen allowed to act upon the anthraquinone compounds, different products of distinct degrees of hydrogenation can be prepared. If anthraquinone is subjected to this process, in the first phase of the reaction anthranol or anthrone is obtained with a practically quantitative yield. In the second phase of reaction tetrahydroanthranol, and by allowing to react still a further quantity of hydrogen, octohydroanthranol is obtained. The final product of the catalytical reduction is octohydroanthracene.

All the known base metal reduction and/or hydrogenation catalysts are suitable for our process, but we have found the mixtures of catalysts which are described in the German Patent No. 369,374 to be especially effective.

By the expressions "base metal reduction catalysts" and "base metal hydrogenation catalysts" we purpose to include those known catalytic agents of reduction and/or of hydrogenation which contain one or more of the base metals, which base metals are present in the catalytic agent either in their elemental form or in the form of their respective oxides or salts.

The new process is not limited to anthraquinone itself as also derivatives of anthraquinone, for example, alkyl-, hydroxy-, nitro-, amino-anthraquinones, naphthanthraquinone, etc., easily can be catalytically reduced in the described manner.

In order to obtain the higher hydrogenated compounds one may start, instead of from an anthraquinone compound itself, from the anthranol body as the next step of hydrogenation.

The new products are intended to be used as starting materials for the production of dyestuffs and therapeutical products. The following examples illustrate the nature of our invention and in what manner it is to be performed, the parts being by weight and all temperatures in degrees centigrade.

Example 1

104 parts of anthraquinone are dissolved in an autoclave in equal parts of amylalcohol—or of decahydronaphthalene, dimethylaniline or of other suitable solvents or diluents. Then about 4 parts of a catalyst,—prepared by precipitating an aqueous solution of 80 parts of nickel sulfate, 20 parts of cobalt sulfate and 3 parts of copper sulfate by means of a carbonate of soda solution,—are added and hydrogen is allowed to pass in at about 150°, until 2 parts of hydrogen are absorbed. The absorption of hydrogen runs so quickly, that the reaction is finished within a short time. After cooling down the product of reaction is filtered off and extracted with hot alcohol. The concentrated alcoholic solution separates by addition of water and after cooling down gives a very good yield of yellow crystals which, when recrystallized from alcohol, have the melting point of pure anthrone (163–165° C.).

Example 2

If 1.4-dimethylanthraquinone is subjected to our process, in the first phase of the reaction an anthranol body is obtained, having probably the formula:

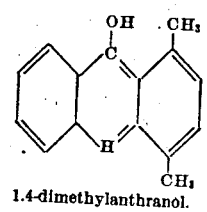

1.4-dimethylanthranol.

The new compound crystallizes from alcohol as colorless needles melting at 112° C., characterized by the fact of turning red when exposed to light.

By hydrogenizing nitroderivatives of anthraquinone, naturally products are obtained which are identical with the compounds resulting from hydrogenizing the corresponding aminoderivatives of anthraquinone.

For instance alpha-nitro-beta-methylanthraquinone and alpha-amino-beta-methylanthraquinone yield both the same anthranol body, having probably the formula:

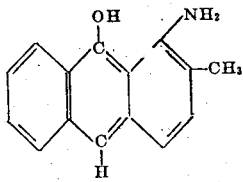

crystallizing from alcohol as golden yellow leaflets melting at 117° C.

Having now particularly described and ascertained the nature of our said invention and in what manner the same is to be performed, we declare that what we claim is:

1. In the process of catalytically reducing anthraquinone compounds the step comprising acting with gaseous hydrogen under pressure upon anthraquinone compounds in the presence of a base metal hydrogenation catalyst.

2. In the process of catalytically reducing anthraquinone compounds the step comprising acting with gaseous hydrogen under pressure and with addition of an organic diluent, upon anthraquinone compounds in the presence of a base metal catalyst.

3. In the process of catalytically reducing anthraquinone compounds the step comprising acting with gaseous hydrogen under pressure and at elevated temperatures upon anthraquinone compounds in the presence of a base metal hydrogenation catalyst.

4. The process of producing an anthranole compound which consists in acting under pressure upon one molecular proportion of an anthraquinone compound in the presence of a base metal hydrogenation catalyst with substantially four atomic proportions of gaseous hydrogen.

5. The process of producing an anthranole compound which consists in acting under pressure and with addition of an organic diluent, upon one molecular proportion of an anthraquinone compound in the presence of a base metal hydrogenation catalyst with substantially four atomic proportions of gaseous hydrogen.

6. The process of producing an anthranole compound which consists in acting under pressure and at elevated temperatures upon one molecular proportion of an anthraquinone compound in the presence of a base metal hydrogenation catalyst with substantially four atomic proportions of gaseous hydrogen.

7. As a new product, 1.4-dimethyl-anthranole having most probably the formula:

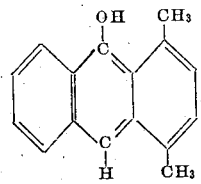

which compound crystallizes from alcohol as colorless needles turning red when exposed to light, and having a definite melting point.

8. Process which comprises acting under pressure upon one molecular proportion of an anthracene compound in which at least one of the meso carbon atoms is directly attached to oxygen and in which at least one of the terminal benzo nuclei is unsaturated with at least four atomic proportions of gaseous hydrogen in the presence of a base metal hydrogenation catalyst.

In testimony whereof we affix our signatures.

JULIUS von BRAUN.
OTTO BAYER.